June 1, 1971    F. J. ROESNER ET AL    3,581,363
METHOD OF MAKING SELF-ALIGNING PLASTIC LINED BEARING
Original Filed March 28, 1968    3 Sheets-Sheet 2

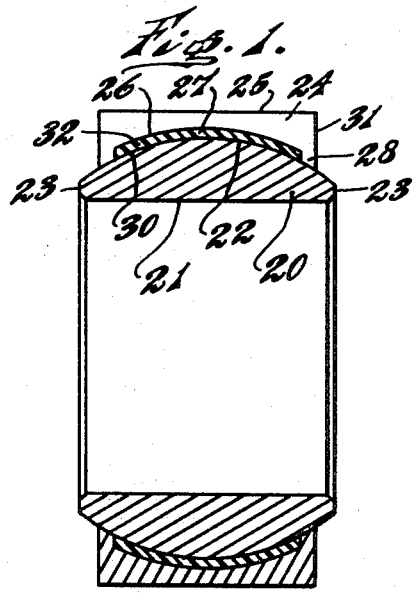
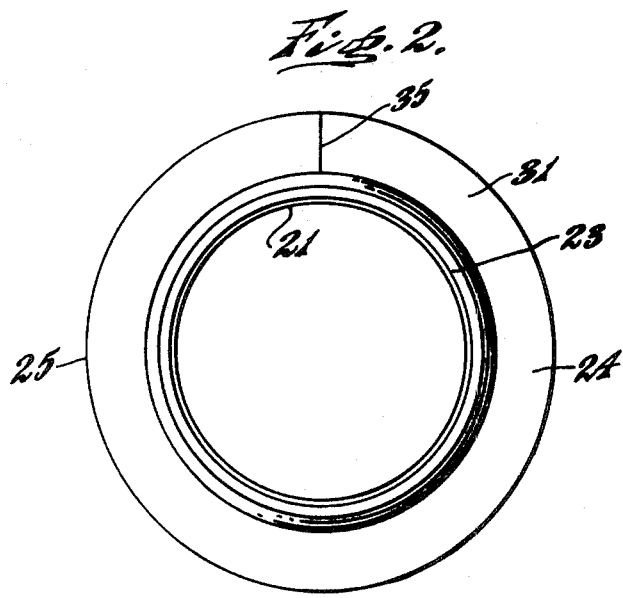
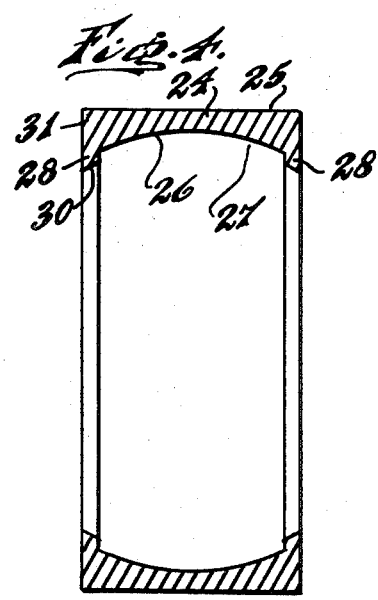
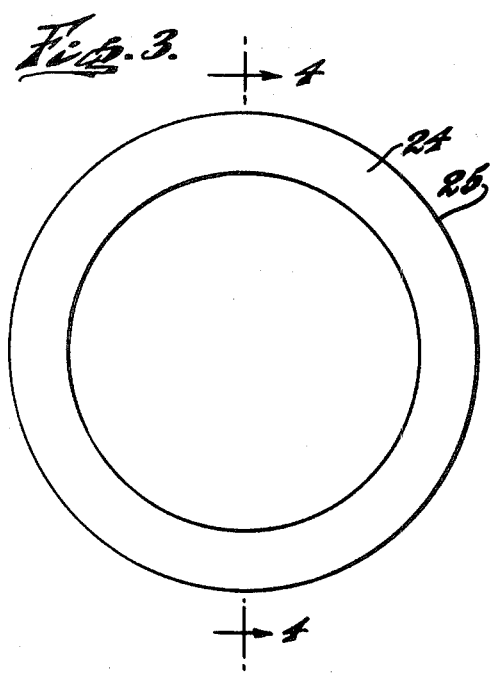

INVENTORS
Franz J. Roesner
Robert C. Bogdan
BY Peter S. Breene

ATTORNEYS

June 1, 1971      F. J. ROESNER ET AL      3,581,363

METHOD OF MAKING SELF-ALIGNING PLASTIC LINED BEARING

Original Filed March 28, 1968      3 Sheets-Sheet 3

INVENTORS.
Franz J. Roesner
Robert C. Bogdan
Peter S. Breene
BY

ATTORNEYS

United States Patent Office 3,581,363
Patented June 1, 1971

3,581,363
METHOD OF MAKING SELF-ALIGNING
PLASTIC LINED BEARINGS
Franz J. Roesner, Trenton, and Robert C. Bogdan, Titusville, N.J., and Peter S. Breene, Philadelphia, Pa., assignors to Roller Bearing Company of America, West Trenton, N.J.
Original application Mar. 28, 1968, Ser. No. 716,910, now Patent No. 3,528,710, dated Sept. 15, 1970. Divided and this application Apr. 18, 1969, Ser. No. 836,188
Int. Cl. B23p *11/00*
U.S. Cl. 29—149.5
5 Claims

ABSTRACT OF THE DISCLOSURE

A method of making self-aligning bearings, by providing an outer race having a spherical internal pocket with shoulders at the ends, breaking the outer race at a least one circumferential point, placing a plastic lining around the inside of the pocket, providing a ball to fit in the outer race, expanding the outer race and lining, inserting the ball therein and contacting the outer race and lining to bring the lining into firm contact with the outside of the ball and retaining the ends by the shoulders in the pocket.

---

This application is a division of application Ser. No. 716,910, filed Mar. 28, 1968 for Self-Aligning Plastic Lined Bearing, now Pat. No. 3,528,710 granted Sept. 15, 1970.

DESCRIPTION OF DISCLOSURE

The present invention relates to a method concerning self-aligning bearings of the type provided with a plastic lining.

A purpose of the invention is to make a self-aligning plastic lined bearing, by providing an outer race having a spherical internal pocket with shoulders at the ends, breaking the outer race at at least one circumferential point, placing a plastic lining around the inside of the pocket, providing a ball to fit the outer race, expanding the outer race and lining, inserting the ball therein and contacting the outer race and lining so that the lining is in firm contact with the outside of the ball and is retained at the ends by the shoulders in the pocket.

A further purpose is to make the lining rough on the outside and smooth on the inside, so that the coefficient of friction between the lining and the outer race will be greater than the coefficient of friction between the lining and the ball, aiding in preventing relative movement of the lining as the ball moves relative thereto.

A further purpose is to employ as a lining either a strip of plastic or an endless plastic formed for example from a tube.

Further purposes appear in the specification and in the claims.

In the drawings we have chosen to illustrate a few only of the numerous embodiments in which the invention may appear, selecting the forms shown from the standpoint of convenience in illustration, satisfactory operation, and clear demonstration of the principles involved.

FIG. 1 is an axial section through an assembled self-aligning bearing of the invention.

FIG. 2 is an end elevation of the bearing of FIG. 1.

FIG. 3 is an end elevation of an outer race for the bearing of the invention after grinding of the spherical internal pocket but before breaking the outer race.

FIG. 4 is a section of FIG. 3 on the line 4—4.

Figure 5:
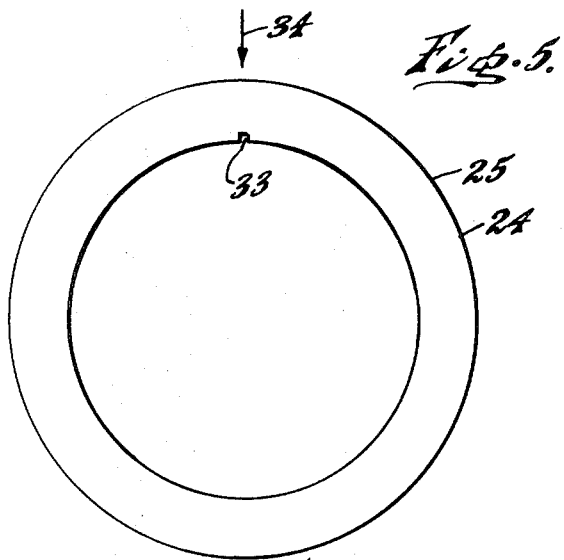
FIG. 5 is a view similar to FIG. 3 showing the outer race after notching for breaking, and illustrating the application of radial load in order to provide a circumferential break in the outer race.

Describing in illustration but not in limitation and referring to the drawings:

Extensive use is being made of self-aligning bearings having in effect an outer race provided with a spherical inner surface, cooperating with an inner race consisting of a ball. These bearings are particularly used on vehicles and machinery where intermittent service and operation at moderate speed are contemplated. Because of the exposure of such bearings to moisture, the problem of corrosion protection is particularly critical, especially in installations where lubrication may be applied in a haphazard manner. An example of such service would be knuckle bearings on an automobile.

An extensive demand has grown up for self-aligning bearings which do not require lubrication and are to a considerable extent protected against damage by corrosion, due to the fact that a plastic lining is provided at the interior of the outer race. These bearings are made by providing a relatively soft outer race, for example, of soft steel, which is lined by a plastic liner, and then cold worked into a spherical contour as it surrounds an inner ball. Bearings of this sort are described in Kravats U.S. Pat. 2,958,927; Williams et al. U.S. Pat. 3,068,552; Evans U.S. Pat. 3,058,312; Litsky U.S. Pat. 3,126,613; Litsky U.S. Pat. 3,163,475; McCloskey U.S. Pat. 3,191,265; Evans U.S. Pat. 3,193,910; and Atwater U.S. Pat. 3,299,583.

There are certain disadvantages in self-aligning bearings made in this way. The outer race must be of a relatively soft material which will undergo cold work. The cold working of the outer race to conform to the ball may in a particular case be a difficult manufacturing operation. After cold work, the interior of the outer race often is only approximately spherical, and therefore the area of contact between the inner and outer races is likely to be limited and the contact pressure unduly high. Often the cold working produces a bearing which is too tight for use, and a further operation must be performed in order to relax the bearing. Under these conditions it is difficult to make a precision fit, and the outer race is not hard to resist wear.

It would be very desirable to produce a self-aligning bearing which would be free from the requirement of lubrication because of the fact that the ball is contacted by a plastic lining, but which would have an outer race of hard material, with a precise spherical contour and with a precision fit.

We have discovered that this can be accomplished. We first make an outer race of a suitable material, for example a hardened material such as steel AISI 52100, or a heat-treatable stainless steel, although the outer race may be made of a nonferrous alloy, for example a suitable bronze. Following well known principles, the outer race is rough machined and then in the case of heat-treatable steel is heat treated to the desired hardness.

Following the heat treatment, the inner race surface of the outer race is precision ground to make an interior pocket having a spherical contour. The pocket must be adequate to retain a plastic lining, and therefore it is provided with shoulders at the opposite ends, the shoulders themselves being suitably spherically ground in the preferred embodiment.

A ball preferably of hardened material such as heat treated steel AISI 52100 or hardened stainless steel is made to fit the race, and a plastic lining is prepared of the correct length, width and thickness to fit in the pocket and to take up the clearance between the ball and the race. The ball may be of a nonferrous alloy such as bronze.

The race is then provided with a circumferential break or interruption, preferably following Zurick U.S. Pat. 3,127,664, so that the race can be manually or mechanically elastically deflected outwardly to a size large enough to pass over the ball and permit assembly with a plastic lining in the pocket. While one circumferential interruption or break is adequate, the race can be broken at two or more circumferential points if desired. In this case the parts can be displaced without elastic deflection. It will be understood that in the assembled bearing the race is held together, for example, by a suitable housing which surrounds it.

It will thus be seen that after assembly the bearing is provided with a suitably hardened outer race and inner ball in the preferred embodiment, has a precision spherical contour on the inside of the outer race, and has a precisely predetermined fit between the outer race, the plastic lining and the ball, not dependent on the vagaries of cold working.

In the drawings we show a ball 20, suitably of a hardened material such as hardened steel, having a cylindrical bore 21 which is slipped on a shaft or the like, a spherical exterior bearing surface 22, and ends 23 which in the preferred embodiment as well known may be engaged by levers, spacers, washers, or otherwise.

In assembled condition, the ball is surrounded by a cooperating outer race 24 which has a suitably cylindrical exterior surface 25 which is adapted to be slipped into the bore of a housing or the like, which performs the dual function of holding the bearing together notwithstanding the break or breaks in the exterior race, and also of completing the assembly.

In the preferred form, the outer race 24 is of a hardened material such as hardened steel and has a precisely ground spherical interior surface 26, ground about the same center as the center of the ball, but spaced from the exterior spherical surface on the ball to form a pocket 27 of substantially uniform radial depth. At the ends, the pocket is closed by shoulders 28 which are desirably machined to provide a spherical surface 30 cooperating with the surface on the outside of the ball, suitably with slight clearance, and tending to seal the pocket against entry of dirt. The outer race has suitably straight ends 31.

The pocket 27 is occupied by a plastic lining 32 which is substantially as wide as the pocket, substantially as long as the annular length of the pocket, and which has a thickness adequate to fill the pocket and provide any desired clearance or any desired compression between the ball and the outer race.

The lining is preferably made of a polyfluoroethylene, such as polytetrafluoroethylene (Teflon) or monochlorotrifluoroethylene (Kel-F). It may also be made of a linear polyamide such as nylon, a polyester plastic such as Dacron, or of polyurethane.

The lining may be a solid strip of plastic such as for example an extrusion or a rolled product, or it may be a fabric woven of plastic fibers, either entirely, or including additional fibers such as vegetable fibers, for example cotton or mineral fibers, for example glass.

FIG. 3 shows an outer race which has been rough machined, heat treated, and finish machined to provide a pocket 27 having an interior spherical surface 26 precision ground as shown in FIG. 4 and closed by shoulders at the ends 28, the interior contour of the shoulders being spherical at 30 to engage the intended ball.

Figure 6:
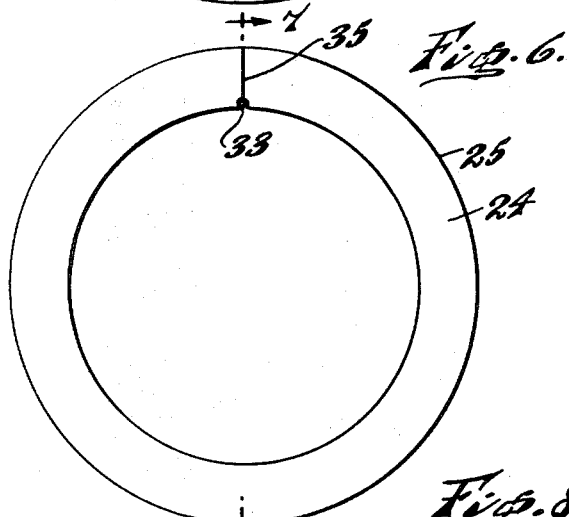
FIG. 6 is an end elevation showing the outer race after it has been broken and after a plastic lining has been inserted in the pocket.
Figure 7:
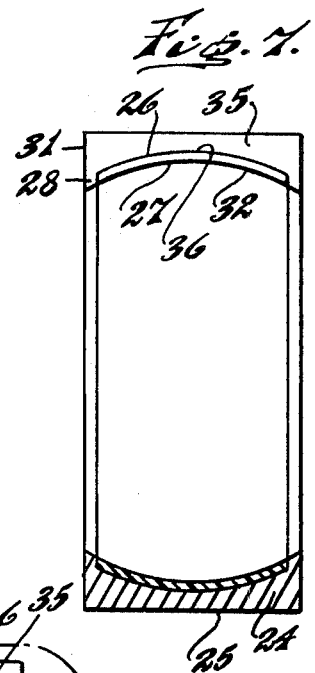
FIG. 7 is a section on the line 7—7 of FIG. 6.

The outer race is preferably suitably notched at 33 and subjected to radial deflection as suggested by the arrow 34 in FIG. 5 as explained in Zurick U.S. Pat. 3,127,664 above referred to, so as to create a radial interruption, crack or break 35 as shown in FIG. 6, permitting deflection of the outer race outwardly to admit the ball. The lining 32 is then fitted in the interior of the pocket as shown in FIG. 7. Where the lining is a strip, the generally abutting ends 36 are conveniently located adjacent the break 35. Instead of exactly conforming to the spherical interior of the outer race, the lining 32 prior to the insertion of the ball may be more or less cylindrical, but this complication has been avoided by showing the lining conforming to the interior of the outer race in FIGS. 7 and 8.

Figure 10:
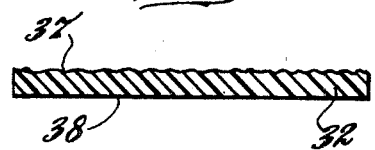
FIG. 10 is an enlarged transverse section of FIG. 9 on the line 10—10.

As shown in FIG. 10, the lining 32 preferably is provided with a roughened surface, on the surface 37 which is to engage the interior of the outer race, and a smooth surface 38 which is to engage the ball. The roughening may be provided by knurling as with a knurling tool, or by etching, or molding, as well known. The roughening is provided as additional insurance that the lining will not turn with the ball since the coefficient of friction where it engages the outer race will be greater than the coefficient of friction where it engages the ball, and also the engagement with the outer race will be on a longer lever arm.

Figure 8:
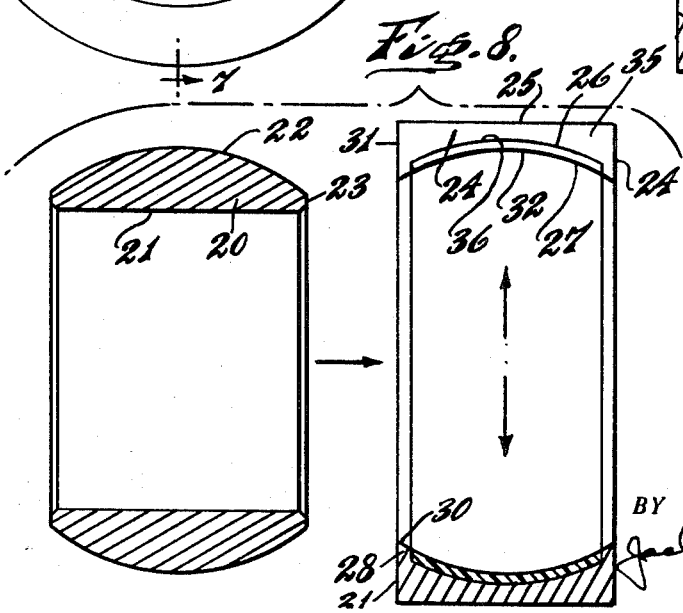
FIG. 8 is an axial section showing the insertion of a ball in the outer race and lining, the outer race being radially expanded and the ball moving in axially to a position within the outer race.
Figure 9:
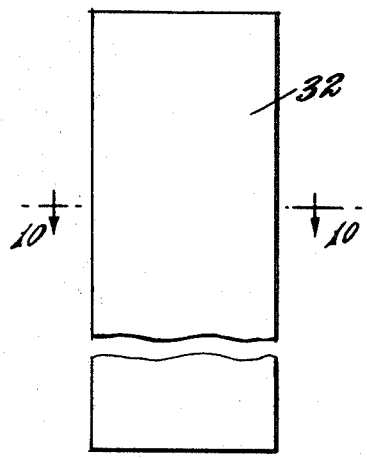
FIG. 9 is a side elevation of a lining of the invention in strip form.

Next the outer race is deflected radially outwardly so as to separate the parts of the break 35 as suggested in FIG. 8, the lining suitably remaining inside in the pocket. The ball 20 is then inserted inside the outer race and the outer race is allowed by its natural spring to contract and bring the plastic lining into engagement with the ball to assemble the bearing. Depending on the bearing's size, the deflection of the outer race can by accomplished by hand or by a suitable expanding device. When the outer race contracts around the ball, the plastic lining, which is capable of undergoing considerable deflection, conforms to the spherical contour of the ball and the outer race, and if it is a strip the ends 36 are brought approximately into abutting relation.

Figure 11:
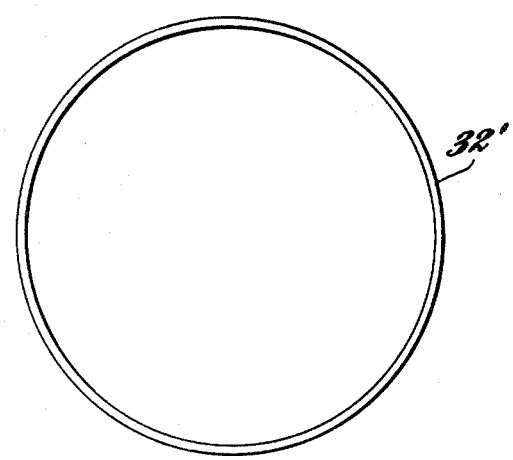
FIG. 11 is an end elevation of a modified form of lining in tubular form.

If the lining 32' as shown in FIG. 11, is endless as in a tube, it may be necessary in assembling to stretch it to fit over the spherical surface of the ball and then contract the outer race to receive the lining in its pocket.

It will be understood that the self-aligning bearing of the invention can be applied with suitable surface coating on the bearing parts of metal, for example a phosphate coating. In the case of the inside of the outer race it may be desirable to apply the phosphate without any wax or other sealer so as to maintain a high coefficient of friction.

In view of our invention and disclosure variations and modifications to meet individual whim or particular need will doubtless become evident to others skilled in the art, to obtain all or part of the benefits of our invention without copying the process shown, and we therefore claim all such insofar as they fall within the reasonable spirit and scope of our claims.

Having thus described our invention, what we claim as new and desire to secure by Letters Patent is:

1. A method of making a self-aligning bearing, which comprises providing an outer race having a spherical internal pocket with shoulders at the ends, breaking the outer race at at least one circumferential point, placing a plastic lining around the inside of the pocket, providing a ball to fit in the outer race, expanding the outer race and lining, inserting the ball therein and contracting the outer race and lining so that the lining is in firm contact with the outside of the ball and is retained at the ends by the shoulders in the pocket.

2. A method of claim 1, in which the lining is rough on the outside and smooth on the inside, which comprises contributing to retain the lining against movement in the pocket by the roughening.

3. A method of claim 1, in which the lining is a strip, which comprises extending the ends of the lining into approximate abutting relationship.

4. A method of claim 1, in which the lining is endless.

5. A method of claim 1, which comprises making the shoulders of spherical contour to engage the ball.

References Cited

UNITED STATES PATENTS

| | | | |
|---|---|---|---|
| 2,624,105 | 1/1953 | Virtue | 29—148.4A |
| 2,958,927 | 11/1960 | Kravats | 29—149.5B |
| 3,068,552 | 12/1962 | Williams et al. | 29—149.5 |
| 3,126,613 | 3/1964 | Litsky | 308—72 |
| 3,127,664 | 4/1964 | Zurick | 29—413X |
| 3,193,910 | 7/1965 | Evans | 29—441X |
| 3,405,434 | 10/1968 | Hoffman et al. | 29—148.4 |

THOMAS H. EAGER, Primary Examiner

U.S. Cl. X.R.

29—413, 441; 308—72